United States Patent
Tanji

(10) Patent No.: US 10,455,630 B2
(45) Date of Patent: Oct. 22, 2019

(54) COMMUNICATION APPARATUS THAT COMMUNICATES WITH ANOTHER COMMUNICATION APPARATUS, CONTROL METHOD THEREOF, AND STORAGE MEDIUM

(71) Applicant: CANON KABUSHIKI KAISHA, Tokyo (JP)

(72) Inventor: Masamichi Tanji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 15/228,114

(22) Filed: Aug. 4, 2016

(65) Prior Publication Data

US 2017/0055274 A1 Feb. 23, 2017

(30) Foreign Application Priority Data

Aug. 21, 2015 (JP) ................................. 2015-164054

(51) Int. Cl.
*H04W 72/08* (2009.01)
*H04W 76/14* (2018.01)
*H04M 1/725* (2006.01)

(52) U.S. Cl.
CPC ......... *H04W 76/14* (2018.02); *H04M 1/7253* (2013.01)

(58) Field of Classification Search
CPC .............................. H04W 72/085; H04L 69/16
See application file for complete search history.

(56) References Cited

U.S. PATENT DOCUMENTS 5,157,662 A * 10/1992 Tadamura .......... H04Q 11/0428
  370/352
9,274,726 B2 * 3/2016 Ito ........................ G06F 3/1236
(Continued)

FOREIGN PATENT DOCUMENTS

JP 2006086878 A 3/2006
JP 2009171307 A 7/2009
JP 2015106798 A 6/2015

OTHER PUBLICATIONS

Office Action issued in Japanese Appln. No. 2015-164054 dated May 28, 2019.
(Continued)

*Primary Examiner* — Parth Patel
(74) *Attorney, Agent, or Firm* — Rossi, Kimms & McDowell LLP

(57) ABSTRACT

An image forming apparatus 100 that can prevent an unnecessary deterioration of data transmission performance. The image forming apparatus 100 has a MTU value input screen 600 including options representing different MTU values each of which can be selected. When it is determined that a present communication mode is a second communication mode realized without directly connecting the image forming apparatus 100 and the external apparatus, the selected MTU value is set as an acceptable amount of the data to be transmitted in a communication between the image forming apparatus 100 and the external apparatus. When it is determined that the present communication mode is a first communication mode realized by directly connecting the image forming apparatus 100 and the external apparatus, a maximum transmittable amount of the data in the first communication mode is set as the acceptable amount of the data to be transmitted.

12 Claims, 7 Drawing Sheets

(56) References Cited

U.S. PATENT DOCUMENTS

| | | | |
|---|---|---|---|
| 2002/0132635 A1* | 9/2002 | Girard et al. | |
| 2004/0109566 A1* | 6/2004 | Yamamoto | H04W 16/00 380/270 |
| 2007/0130296 A1* | 6/2007 | Kim | H04W 76/11 709/220 |
| 2009/0185572 A1 | 7/2009 | Yasuma | |
| 2011/0177780 A1* | 7/2011 | Sato | H04W 36/14 455/41.1 |
| 2011/0244849 A1* | 10/2011 | Misumi | H04W 48/08 455/422.1 |
| 2011/0292445 A1* | 12/2011 | Kato | G06F 3/1222 358/1.15 |
| 2012/0173003 A1* | 7/2012 | Kim | H04N 21/42207 700/12 |
| 2012/0178380 A1* | 7/2012 | Fleck | H04W 52/0274 455/69 |
| 2013/0094047 A1* | 4/2013 | Bailey | H04L 63/18 358/1.14 |
| 2013/0148161 A1* | 6/2013 | Park | G06F 3/1296 358/1.15 |
| 2014/0073244 A1* | 3/2014 | Ko | H04W 4/008 455/41.1 |
| 2014/0085666 A1* | 3/2014 | Park | G06K 15/405 358/1.15 |
| 2014/0168681 A1* | 6/2014 | Nakamura | G06F 3/1276 358/1.13 |
| 2014/0185602 A1* | 7/2014 | Goto | H04W 8/005 370/338 |
| 2014/0268222 A1* | 9/2014 | Inoue | G06F 3/1221 358/1.15 |
| 2014/0268223 A1* | 9/2014 | Kimura | H04N 1/00413 358/1.15 |
| 2014/0269507 A1* | 9/2014 | Tanji | H04W 76/23 370/328 |
| 2014/0273850 A1* | 9/2014 | Park | H04W 76/14 455/41.2 |
| 2014/0287690 A1* | 9/2014 | Kim | H04W 4/80 455/41.3 |
| 2014/0320886 A1* | 10/2014 | Uchikawa | H04N 1/4433 358/1.14 |
| 2014/0355047 A1* | 12/2014 | Lee | G06F 3/1292 358/1.15 |
| 2014/0373123 A1* | 12/2014 | Kang | H04L 41/22 726/7 |
| 2015/0084748 A1* | 3/2015 | Davis | G08C 17/02 340/12.5 |
| 2015/0124599 A1* | 5/2015 | Yui | H04W 28/065 370/230 |
| 2015/0193613 A1* | 7/2015 | Kim | G06F 21/36 726/19 |
| 2015/0331648 A1* | 11/2015 | Tomomatsu | G06F 3/1258 358/1.15 |
| 2016/0128119 A1* | 5/2016 | Maheshwari | H04W 4/08 370/329 |
| 2016/0255245 A1* | 9/2016 | Ishibashi | H04N 1/4433 358/1.14 |
| 2016/0278143 A1* | 9/2016 | Akhtar Masoom Akhtar | H04W 84/12 |
| 2016/0360343 A1* | 12/2016 | Shi | H04W 76/14 |
| 2017/0054694 A1* | 2/2017 | Fujikami | H04L 9/08 |
| 2017/0054839 A1* | 2/2017 | Ishikawa | H04W 52/0274 |
| 2017/0188296 A1* | 6/2017 | Fujikami | H04W 48/18 |
| 2017/0207859 A1* | 7/2017 | Kim | H04B 11/00 |
| 2017/0285788 A1* | 10/2017 | Park | H04L 67/06 |

OTHER PUBLICATIONS

"ADSL speed up laboratory." DOS/V magazine. Nov. 1, 2001: 144-153. vol. 10, No. 21. SoftBank Publishing Inc. Cited in NPL 1. Partial English translation provided.

Shimizu et al. "Implementation and Evaluation of a 10-Gbps Network Interface Card Supporting OC-192c POS and 10GbE Modes." The Institute of Electronics, Information and Communication Engineers (IEICE). Technical Report of IEICE. Jul. 8, 2004: 7-12. vol. 104, No. 181. Cited in NPL 1. Partial English translation provided.

* cited by examiner

COMMUNICATION APPARATUS THAT COMMUNICATES WITH ANOTHER COMMUNICATION APPARATUS, CONTROL METHOD THEREOF, AND STORAGE MEDIUM

BACKGROUND OF THE INVENTION

Field of the Invention

The present invention relates to a communication apparatus, a control method thereof, and a storage medium, and relates to a communication apparatus using packet transmission, a control method thereof, and a storage medium.

Description of the Related Art

There is a known communication apparatus that performs a communication (for example, a wireless direct communication) that is realized by being directly connected with another communication apparatus, in addition to a communication (for example, a wired LAN communication) that is realized by being connected with another communication apparatus via a plurality of paths. Such a communication apparatus performs a TCP/IP communication with another communication apparatus and, in TCP/IP communication, a maximum amount of data which can be transmitted in a single transfer process is set as an MTU (Maximum Transmission Unit) value. Here, when a relatively large amount of data is transmitted, the communication apparatus divides and allocates the data to be transmitted into a plurality of transmission packets so that the data amount (size) of a single transmission packet does not exceed the MTU value.

As described above, the communication apparatus can communicate with another communication apparatus by communications in various modes (such as a wired LAN communication and a wireless direct communication), and maximum transmittable amount of data are not the same in communication in the respective modes (hereinafter, referred to as a "maximum transmittable data amount"). For example, in the wired LAN communication, the maximum transmittable data amount is determined based on a transmittable data amount of a path having the smallest transmittable data amount among the respective paths that constitutes the wired LAN. On the other hand, in the wireless direct communication, the maximum transmittable data amount is not determined based on the transmittable data amount of a path since any path does not exist.

Further, in the communication in any mode, a transmission packet in a size that exceeds the maximum transmittable data amount of the communication cannot be efficiently and certainly transmitted. For example, in the wired LAN communication, a transmission packet in a size that exceeds the maximum transmittable data amount may be divided into a plurality of transmission packets, and this may result in a longer data transmission period. Further, a transmission packet in the size that exceeds the maximum transmittable data amount may be discarded as an untransmittable transmission packet. Here, by setting a data amount that does not exceed the maximum transmittable data amount of the communication in each mode as an MTU value and then using a transmission packet in a size which does not exceed the MTU value, the transmission packet can be efficiently and certainly transmitted in the communication in each mode.

As a method to set the MTU value properly, for example, the applicant has proposed a method for detecting a data length of a transmission packet which can be transferred without being divided and setting an MTU value based on the detected data length in a logical connection (VPN) (for example, see Japanese Patent Application Laid-Open No. 2009-171307). Further, there is a known method for displaying an MTU value set menu on an operation unit of a communication apparatus, which is a display panel for example, and setting, by a user, a single proper MTU value using the MTU value set menu as considering the maximum transmittable data amount of the communication in each mode. In the both methods, the set single MTU value is applied to the communications in all modes, and a transmission packet in a size which does not exceed the MTU value is transmitted in the communication in each mode.

However, the single MTU value set in the above described methods is a data amount which does not exceed the maximum transmittable data amount of the communication in each mode and, in other words, it corresponds to a minimum value of the maximum transmittable data amounts of the communications in the respective modes. Thus, there may be a case that, in a wireless direct communication which has a relatively large maximum transmittable data amount for example, a transmission packet which is considerably smaller than the maximum transmittable data amount of the wireless direct communication is transmitted. This may cause an unnecessary deterioration of the data transmission performance when transmitting data using a transmission packet.

SUMMARY OF THE INVENTION

The present invention provides a communication apparatus that can prevent an unnecessary deterioration of data transmission performance, a control method thereof, and a storage medium.

Accordingly, the present invention provides a communication apparatus that communicates with another communication apparatus, the communication apparatus comprising a data amount input unit configured to receive an input of a data amount transmittable in the communication, a mode determination unit configured to determine whether the communication mode is a first communication mode that is realized by directly connecting the communication apparatus and the other communication apparatus or a second communication mode that is realized without directly connecting the communication apparatus and the other communication apparatus, and a data amount set unit configured to set an acceptable amount of the data to be transmitted in the communication, wherein when the mode determination unit determines that the communication mode is the second communication mode, the data amount set unit sets the data amount input to the data amount input unit as the acceptable amount of the data to be transmitted in the communication, and when the mode determination unit determines the communication mode is the first communication mode, the data amount set unit sets a maximum transmittable amount of the data in the first communication mode as the acceptable amount of the data to be transmitted in the communication.

Accordingly, the present invention provides a communication apparatus that communicates with another communication apparatus, the communication apparatus comprising a data amount input unit configured to receive an input of a first data amount transmittable in a first communication mode that is realized by directly connecting the communication apparatus and the other communication apparatus and a second data amount transmittable in a second communication mode that is realized without directly connecting the communication apparatus and the other communication apparatus, a mode determination unit configured to determine whether the communication mode is the first communication mode or the second communication mode, and a data amount set unit configured to set an acceptable amount of the data to be transmitted in the communication, wherein when the mode determination unit determines that the communication mode is the first communication mode, the data amount set unit sets the first data amount as the acceptable amount of the data to be transmitted in the communication, and when the mode determination unit determines that the communication mode is the second communication mode, the data amount set unit sets the second data amount as the acceptable amount of the data to be transmitted in the communication.

According to the present invention, an unnecessary deterioration of the data transmission performance can be prevented.

Further features of the present invention will become apparent from the following description of exemplary embodiments (with reference to the attached drawings).

DESCRIPTION OF THE EMBODIMENTS

The following embodiments of the present invention will be described with a case that the present invention is applied to an MFP, for example, which is an image forming apparatus as a communication apparatus; however, the present invention may be applied to a printer having a communication function. In other words, the present invention can be applied to any apparatus which has a communication function.

Firstly, a first embodiment of the present invention will be described.

Figure 1:
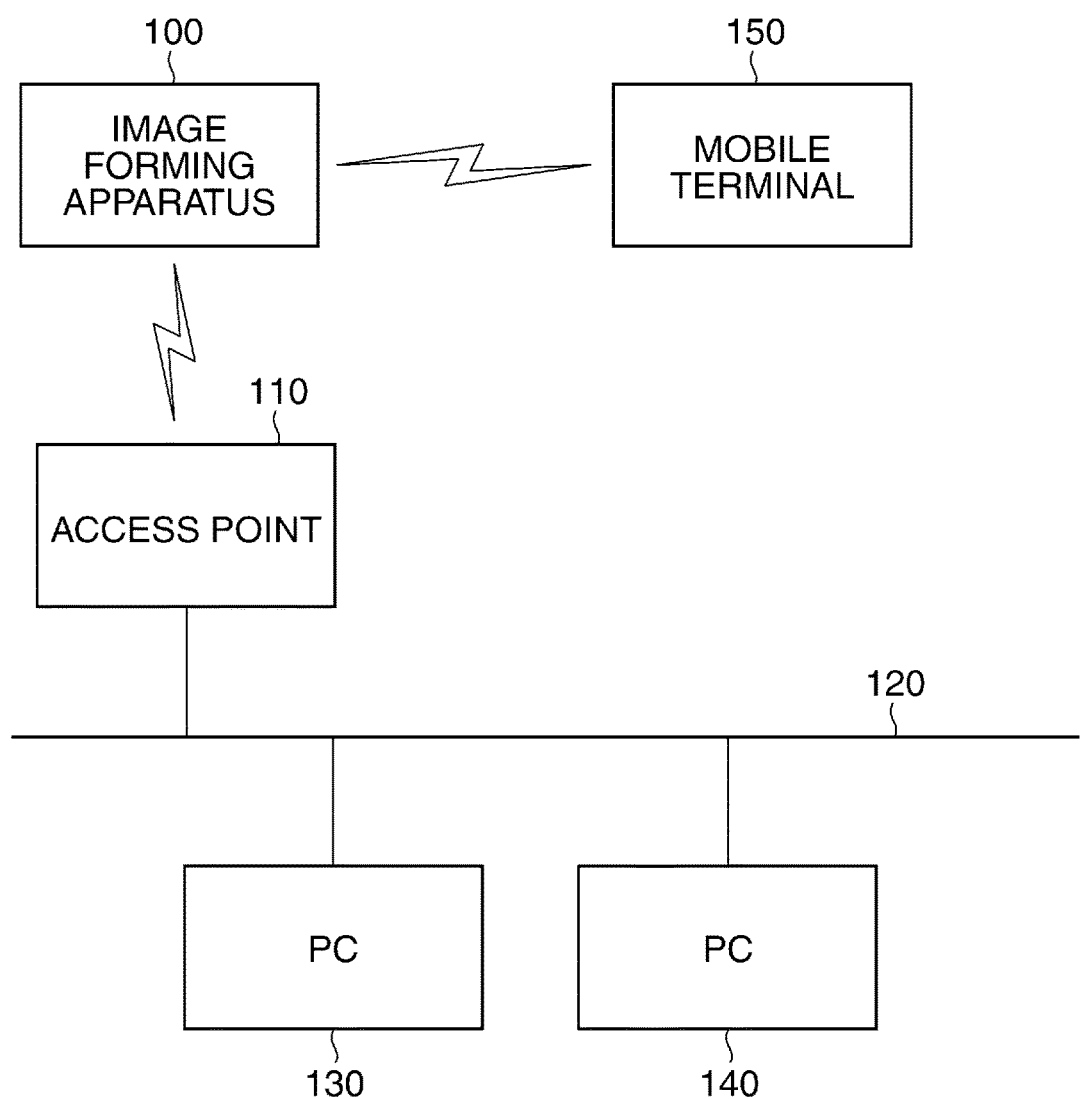
FIG. 1 is a diagram to explain a communication environment that includes an image forming apparatus serving as a communication apparatus according to a first embodiment of the present invention.

FIG. 1 is a diagram to explain a communication environment including an image forming apparatus serving as a communication apparatus according to the present embodiment.

In FIG. 1, the communication environment is composed of the image forming apparatus 100 (communication apparatus), an access point 110 (different access point), a LAN 120, PCs 130 and 140 (other communication apparatuses), and a mobile terminal 150 (another communication apparatus). The image forming apparatus 100, as a client, is wirelessly and indirectly connected to the LAN 120 via the access point 110. To the LAN 120, in addition to the access point 110, the PC 130 and PC 140 are connected by cables. The image forming apparatus 100 and the PC 130 or PC 140 can communicate with each other via the access point 110 or the LAN 120. For example, the PC 130 or PC 140 can transmit print data to the image forming apparatus 100. Alternatively, the image forming apparatus 100 can transmit scanned data to the PC 130 or PC 140. It should be noted that the image forming apparatus 100 may be directly connected to the LAN 120 without the access point 110. In this case, the image forming apparatus 100 is connected to the LAN 120 by a cable. Further, according to the present embodiment, the connection between the LAN 120 and the access point 110, the PC 130, and PC 140 may partially or entirely be realized by wireless connection.

Further, the image forming apparatus 100 is directly and wirelessly connected to the mobile terminal 150 without an access point. The direct wireless communication between the image forming apparatus 100 and the mobile terminal 150 is, for example, a wireless LAN communication using Wi-Fi Direct (registered trademark) function.

Figure 2:
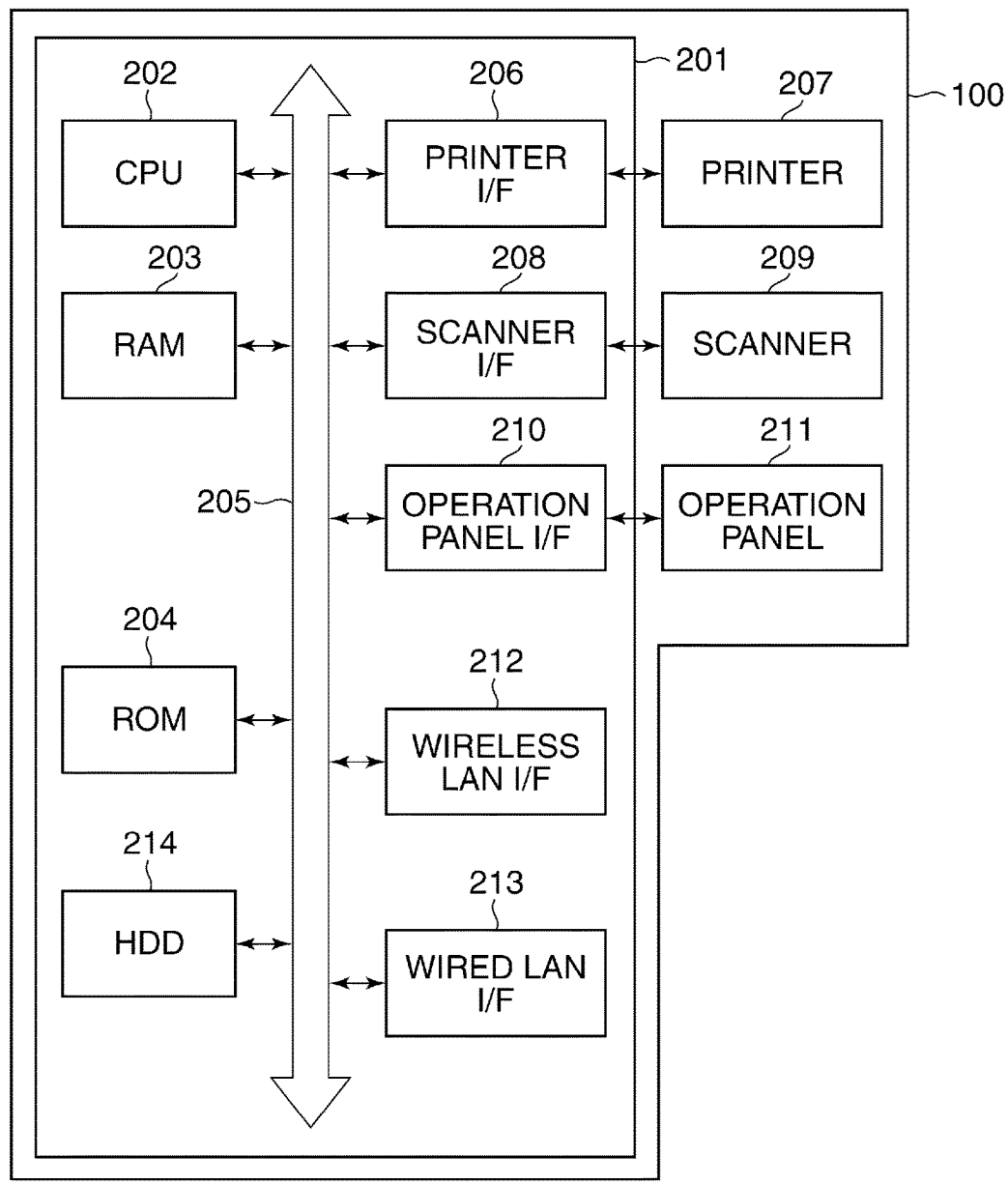
FIG. 2 is a diagram schematically showing a hardware configuration of the image forming apparatus of FIG. 1.

FIG. 2 is a diagram schematically showing a hardware configuration of the image forming apparatus in FIG. 1.

In FIG. 2, the image forming apparatus 100 includes, as blocks, a control unit 201, a printer 207 (printer engine), a scanner 209 (scanner engine), and an operation panel 211. The control unit 201 controls the entire operation of the image forming apparatus 100. Further, the control unit 201 includes, as blocks, a CPU 202, a RAM 203, a ROM 204, a printer I/F 206, a scanner I/F 208, an operation panel I/F 210, a wireless LAN I/F 212, a wired LAN I/F 213, and an HDD 214. These blocks are connected with one another via a system bus 205. The CPU 202 performs various controls such as a communication control by reading out and executing a control program stored in the ROM 204. The RAM 203 is used as a temporary storage area such as a main memory or a work area or the like of the CPU 202. The HDD 214 stores data, various programs, or various information tables. The printer I/F 206 functions as an interface for outputting a record image signal to the printer 207. The scanner I/F 208 functions as an interface to which a scanned image signal from the scanner 209 is input. The operation panel I/F 210 connects the operation panel 211 and the control unit 201. The operation panel 211 has a liquid crystal display with a touch panel function or a keyboard and accepts user's operation and input. The wireless LAN I/F 212 is connected to the access point 110 and the mobile terminal 150 by wireless LAN communication to transmit information to external apparatuses such as the PC 130, PC 140, and mobile terminal 150 or receive various information from the external apparatuses. The wired LAN I/F 213 transmits information to the external apparatus such as the PC 130 and PC 140 or receive various information from the external apparatus by wired LAN (for example, Ethernet (registered trademark)) communication. In the image forming apparatus 100, the CPU 202 processes the scanned image signal input from the scanner I/F 208 and outputs the processed image signal to the printer I/F 206 as a record image signal. Further, the CPU 202 transmits the record image signal to the external apparatus via the wireless LAN I/F 212 or the wired LAN I/F 213.

Figure 3:
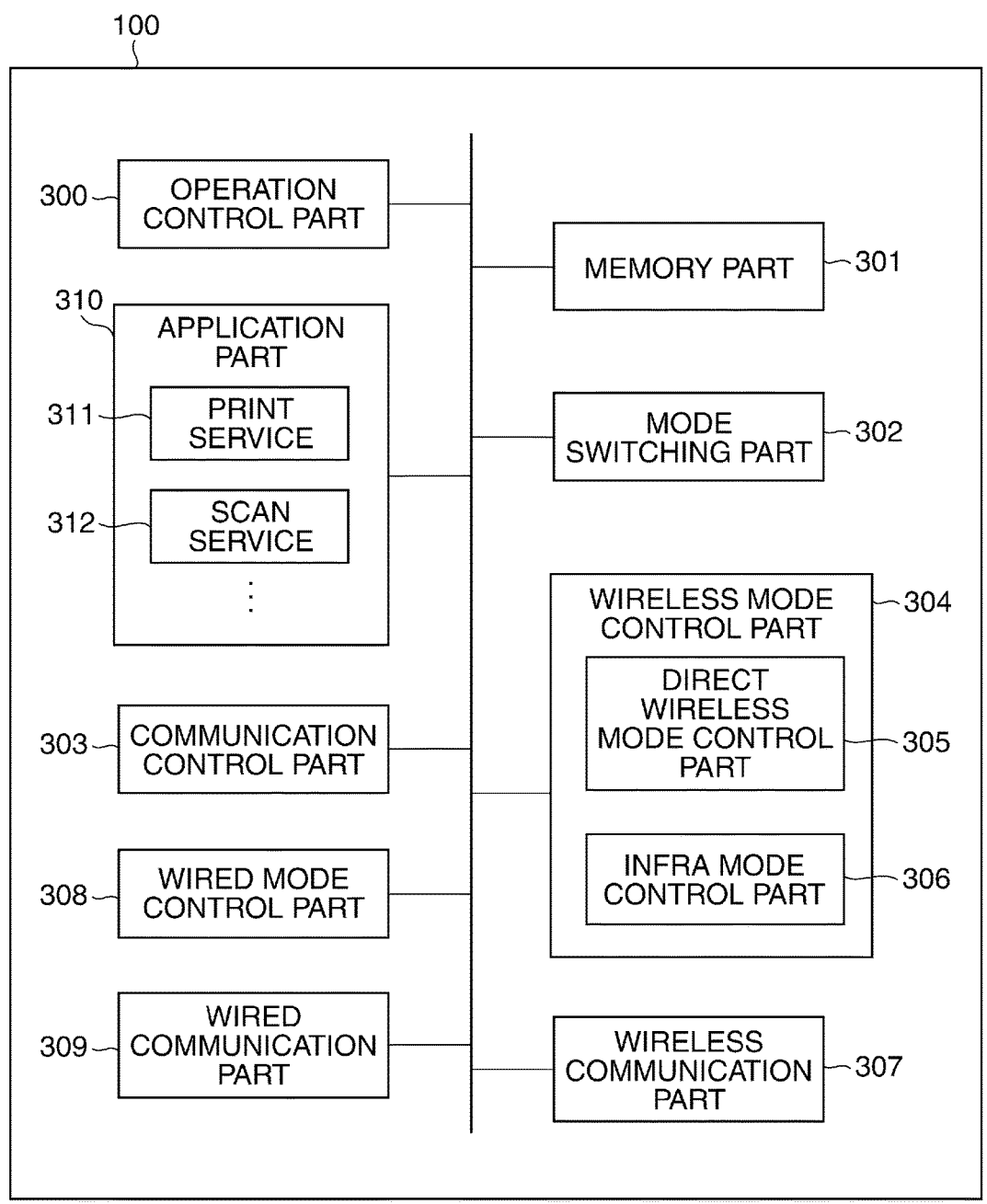
FIG. 3 is a diagram schematically showing a software configuration of the image forming apparatus of FIG. 1.

FIG. 3 is a diagram schematically showing a software structure of the image forming apparatus of FIG. 1. Each function unit in FIG. 3 is realized through execution of a control program stored in the ROM 204 by the CPU 202 in FIG. 2.

In FIG. 3, the image forming apparatus 100 includes, as blocks, an operation control part 300, a memory part 301, a mode switching part 302, a communication control part 303, a wireless mode control part 304, a wireless communication part 307, a wired mode control part 308, and a wired communication part 309. The operation control part 300 controls the operation panel 211 such as to display an operation menu on the liquid crystal display of the operation panel 211 to accept user's instruction, notifies the content of the accepted instruction to other function units, and displays a result caused in response to the instruction on the operation panel 211. Based on an instruction from another function unit, the memory part 301 stores data corresponding to the instruction to the ROM 204 or HDD 214 or reads out data stored in the ROM 204 or HDD 214.

Here, in the present embodiment, as communication modes, there are a mode to perform a wired LAN communication (hereinafter, referred to as "wired mode") (second communication mode) and modes each performing communication using a wireless LAN (hereinafter, referred to as "wireless mode"). Further, as the wireless modes, there are a direct wireless mode (first communication mode) and an infra mode (second communication mode). In the wired mode, the image forming apparatus 100 is not directly connected to the PC 130 or PC 140 and there are respective wires as a plurality of paths between the image forming apparatus 100 and the PC 130 or PC 140. The direct wireless mode is a mode in which the image forming apparatus 100 is directly connected to the mobile terminal 150 and performs a wireless direct communication with the mobile terminal 150 by using a Wi-Fi Direct function for example. Further, the direct wireless mode may be a mode in which the image forming apparatus 100 serves as a simple access point and the mobile terminal 150 is wirelessly and directly connected to the image forming apparatus 100 as a client to perform a wireless direct communication. The infra mode is a infrastructure mode and is a mode in which the image forming apparatus 100 is wirelessly connected to the access point 110 as a client such as to communicate with the PC 130 or PC 140 via the access point 110 and the LAN 120. In other words, in the infra mode, the image forming apparatus 100 is not directly connected to the PC 130 or PC 140 and there are a plurality of paths between the image forming apparatus 100 and the PC 130 or PC 140. The mode switching part 302 of the image forming apparatus 100 performs a mode switching process of the communication performed by the image forming apparatus 100. The communication control part 303 controls the communication between the image forming apparatus 100 and an external apparatus such as the PC 130, PC 140, or the mobile terminal 150. More specifically, the communication control part 303 transfers data transmitted from the application part 310 to the wireless communication part 307 or wired communication part 309 and then sends the data out to the network that composes a wireless LAN or a wired LAN. Further, the communication control part 303 transfers the data received from the network via the wireless communication part 307 or wired communication part 309 to the application part 310.

The wireless mode control part 304 includes a direct wireless mode control part 305 and an infra mode control part 306 and controls communications in the wireless mode. The direct wireless mode control part 305 (data amount set unit) controls communications in the direct wireless mode and maintains a later described MTU value of the direct wireless mode. When the mode switching part 302 switches a communication mode of the image forming apparatus 100 to the direct wireless mode, the mode switching part 302 transfers an MTU value of the direct wireless mode to the direct wireless mode control part 305 as a parameter. The direct wireless mode control part 305 maintains the transferred MTU value of the direct wireless mode. Further, when the data transmitted from the application part 310 is transferred to the wireless communication part 307 in the direct wireless mode, the communication control part 303 acquires the MTU value of the direct wireless mode from the direct wireless mode control part 305. In this case, the size of the transferred data exceeds the MTU value of the direct wireless mode, the communication control part 303 divides the transferred data so that the size of the respective pieces of the divided data are reduced to be equal to or less than the MTU value of the direct wireless mode, and transfers the respective pieces of the divided data to the wireless communication part 307. The infra mode control part 306 (data amount set unit) controls communications in the infra mode and maintains the MTU value of the infra mode. When the mode switching part 302 switches the communication mode of the image forming apparatus 100 to the infra mode, the mode switching part 302 transfers the MTU value of the infra mode to the infra mode control part 306 as a parameter. The infra mode control part 306 maintains the transferred MTU value of the infra mode. Further, when the data transmitted from the application part 310 is transferred to the wireless communication part 307 in the infra mode, the communication control part 303 acquires the MTU value of the infra mode from the infra mode control part 306. In this case, when the size of the transferred data exceeds the MTU value of the infra mode, the communication control part 303 divides the transferred data so that the size of the respective pieces of the divided data are reduced to be equal to or less than the MTU value of the infra mode, and transfers the respective pieces of the divided data to the wireless communication part 307.

The wireless communication part 307 controls the wireless LAN I/F 212. When the mode switching part 302 switches the communication mode to the direct wireless mode, the application part 310 transmits and receives data to and from the external apparatus such as the PC 130, PC 140, or mobile terminal 150 via the wireless communication part 307.

The wired mode control part 308 (data amount set unit) controls communications in the wired mode and maintains the MTU value of the wired mode. When the mode switching part 302 switches the communication mode of the image forming apparatus 100 to the wired mode, the mode switching part 302 transfers the MTU value of the wired mode to the wired mode control part 308 as a parameter. The wired mode control part 308 maintains the transferred MTU value of the wired mode. Further, when the data transmitted from the application part 310 is transferred to the wired communication part 309 in the wired mode, the communication control part 303 acquires the MTU value of the wired mode from the wired mode control part 308. In this case, when the size of the transferred data exceeds the MTU value of the wired mode, the communication control part 303 divides the transferred data so that the respective pieces of divided data are reduced to be equal to or less than the MTU value of the wired mode, and transfers the respective pieces of divided data to the wired communication part 309.

The wired communication part 309 controls the wired LAN I/F 213. When the mode switching part 302 switches the communication mode to the wired mode, the application part 310 transmits and receives data to and from the external apparatus such as the PC 130 or PC 140 via the wired communication part 309. The application part 310 is composed of applications of various services such as a print service 311 and a scan service 312. The print service 311 receives, via the communication control part 303, print data that the wireless communication part 307 or wired communication part 309 has received from the network and outputs the print data to the printer 207 via the printer I/F 206. The scan service 312 transmits scanned data, which is received from the scanner 209 via the scanner I/F 208, to the network from the wireless communication part 307 or wired communication part 309 via the communication control part 303.

Figure 4:
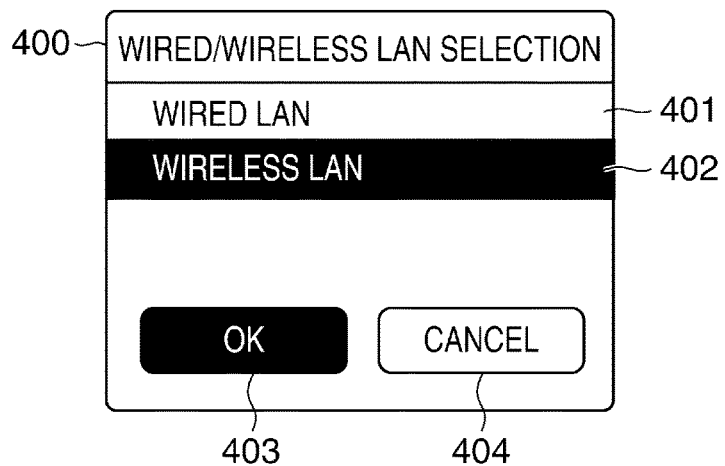
FIG. 4 is a diagram showing an example of a wired/wireless LAN selection screen.

FIG. 4 is a diagram showing an example of a wired/wireless LAN selection screen.

The wired/wireless LAN selection screen 400 of FIG. 4 is one of a plurality of setting menus to be displayed on the liquid crystal display of the operation panel 211 and is used when setting the communication mode of the image forming apparatus 100 to the wired mode or wireless mode. The wired/wireless LAN selection screen 400 includes two options of a "wired LAN" 401 and a "wireless LAN" 402, an OK key 403, and a cancel key 404. The "wired LAN" 401 is an option corresponding to the wired mode, and the "wireless LAN" 402 is an option corresponding to the wireless mode. When the OK key 403 is pressed in a condition that one of the "wired LAN" 401 and "wireless LAN" 402 is being selected by a cursor or the like, the operation control part 300 controls so that the communication mode corresponding to the selected option is maintained in the memory part 301 as communication mode information. When the OK key 403 is pressed in a condition that the "wired LAN" 401 is being selected, the wired mode is maintained as the communication mode information and afterwards, the communication mode of the image forming apparatus 100 is switched to the wired mode. On the other hand, when the OK key 403 is pressed in a condition that the "wireless LAN" 402 is being selected, a later described wireless LAN setting screen 500 is displayed on the operation panel 211. When the cancel key 404 is pressed, regardless of the selection of the option by the cursor, the communication mode information is not maintained in the memory part 301 and the wired/wireless LAN selection screen 400 is immediately terminated.

Figure 5:
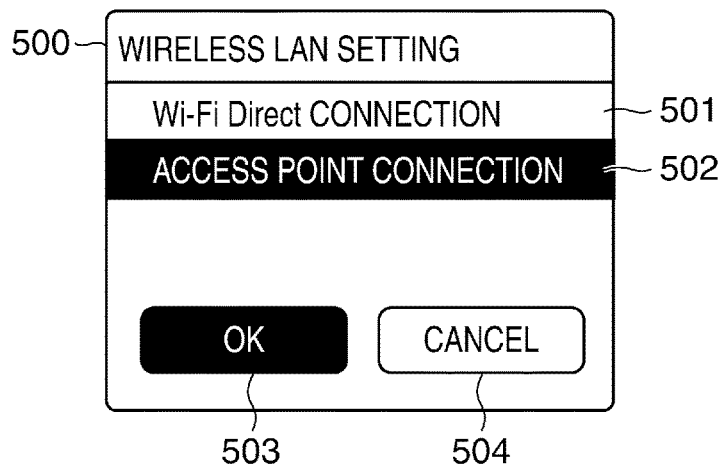
FIG. 5 is a diagram showing an example of a wireless LAN setting screen.

FIG. 5 is a diagram showing an example of a wireless LAN setting screen.

The wireless LAN setting screen 500 of FIG. 5 is also one of the plurality of setting menus to be displayed on the liquid crystal display of the operation panel 211 and is used for setting the communication mode of the image forming apparatus 100 to the direct wireless mode or infra mode. The wireless LAN setting screen 500 includes two options of a "Wi-Fi Direct connection" 501 and an "access point connection" 502, an OK key 503, and a cancel key 504. The "Wi-Fi Direct connection" 501 is an option corresponding to the direct wireless mode and the "access point connection" 502 is an option corresponding to the infra mode. When the OK key 503 is pressed in a condition that one of the "Wi-Fi Direct connection" 501 and "access point connection" 502 is being selected by a cursor or the like, the communication mode corresponding to the selected option is maintained in the memory part 301 as communication mode information. When the OK key 503 is pressed in a condition that the "Wi-Fi Direct connection" 501 is being selected, the direct wireless mode is maintained as communication mode information and, afterwards, the communication mode of the image forming apparatus 100 is switched to the direct wireless mode. On the other hand, when the OK key 503 is pressed in a condition that the "access point connection" 502 is being selected, the infra mode is maintained as communication mode information, and afterwards, the communication mode of the image forming apparatus 100 is switched to the infra mode. When the cancel key 504 is pressed, regardless of the selection of the option by the cursor, the wireless LAN setting screen 500 is immediately terminated without maintaining the communication mode information in the memory part 301.

Figure 6:
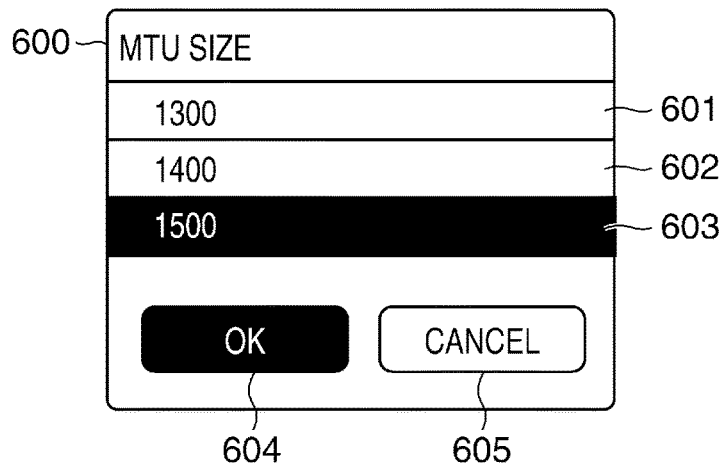
FIG. 6 is a diagram showing an example of an MTU value input screen according to the first embodiment of the present invention.

FIG. 6 is a diagram showing an example of an MTU value input screen according to the first embodiment of the present invention.

The MTU value input screen 600 (data amount input unit) of FIG. 6 is one of the plurality of setting menus to be displayed on the liquid crystal display of the operation panel 211 and is used when a user inputs an MTU value (communication transmittable data amount). The MTU value input screen 600 includes three options representing MTU values which are a "1300" 601, a "1400" 602, and a "1500" 603, an OK key 604, and a cancel key 605. When the OK key 604 is pressed in a condition that one of the three options is being selected by a cursor or the like, an MTU value corresponding to the selected option (the data amount input in the data amount input unit) is maintained in the memory part 301. For example, when the "1500" 603 is selected, 1500 bytes is maintained as the MTU value. When the MTU value is set, it is generally preferable to select the "1500" 603 corresponding to 1500 bytes, which is the maximum transmittable amount of the data of Ethernet (registered trademark) (wired LAN or wireless LAN). However, there may be a case that there is a path having a transmittable data amount smaller than 1500 bytes due to an existence of a filter or the like among a plurality of paths that exist between the image forming apparatus 100 and the PC 130 in the wired mode or the infra mode. In this case, if the MTU value is set as 1500 bytes, there may be caused a problem that a transmission packet having a size of the MTU value (that is, a 1500-byte transmission packet) cannot be transmitted between the image forming apparatus 100 and the PC 130. When such a problem occurs, the user selects the "1300" 601 or "1400" 602, which are options of smaller data amounts to set the MTU value smaller than 1500 bytes. With this, the size of a transmission packet can be made smaller than 1500 bytes. As a result, even when there is a path of which transmittable data amount is smaller than 1500 bytes between the image forming apparatus 100 and PC 130, a transmission packet may be transmitted between the image forming apparatus 100 and PC 130. Further, when the cancel key 605 is pressed, regardless of the selection of the option by the cursor, the MTU value input screen 600 is immediately terminated without storing the MTU value in the memory part 301.

Here, the MTU value input screen 600 includes three options of the "1300" 601, "1400" 602, and "1500" 603 as an example; however, the options of the MTU value input screen 600 to set the MTU value are not limited to this example. For example, the MTU value input screen 600 may further include more different options. Further, the MTU value input screen 600 may include a field in which the user can directly input a desired MTU value in a text format or the like, as a substitute for the plurality of the options described above.

Here, as described above, when an MTU value of data amount smaller than 1500 bytes which is the maximum transmittable amount of the data of Ethernet (registered trademark) is set on the MTU value input screen 600, a following problem occurs. Specifically, in the direct wireless mode, since the image forming apparatus 100 is directly connected to the mobile terminal 150, the plurality of paths do not exist between the image forming apparatus 100 and mobile terminal 150. Thus, in the direct wireless mode, there is not a path having a transmittable data amount smaller than 1500 bytes. In this case, when a MTU value of data amount smaller than 1500 bytes is set on the MTU value input screen 600, a transmission packet in a size smaller than the maximum transmittable amount of the data (1500 bytes) in the direct wireless mode is merely transmitted. As a result, in the direct wireless mode, data transmission performance is unnecessarily deteriorated. According to the present embodiment, to solve the above problem, the MTU value of the direct wireless mode is set to a value different from the MTU value of the wired mode or infra mode.

Figure 7:
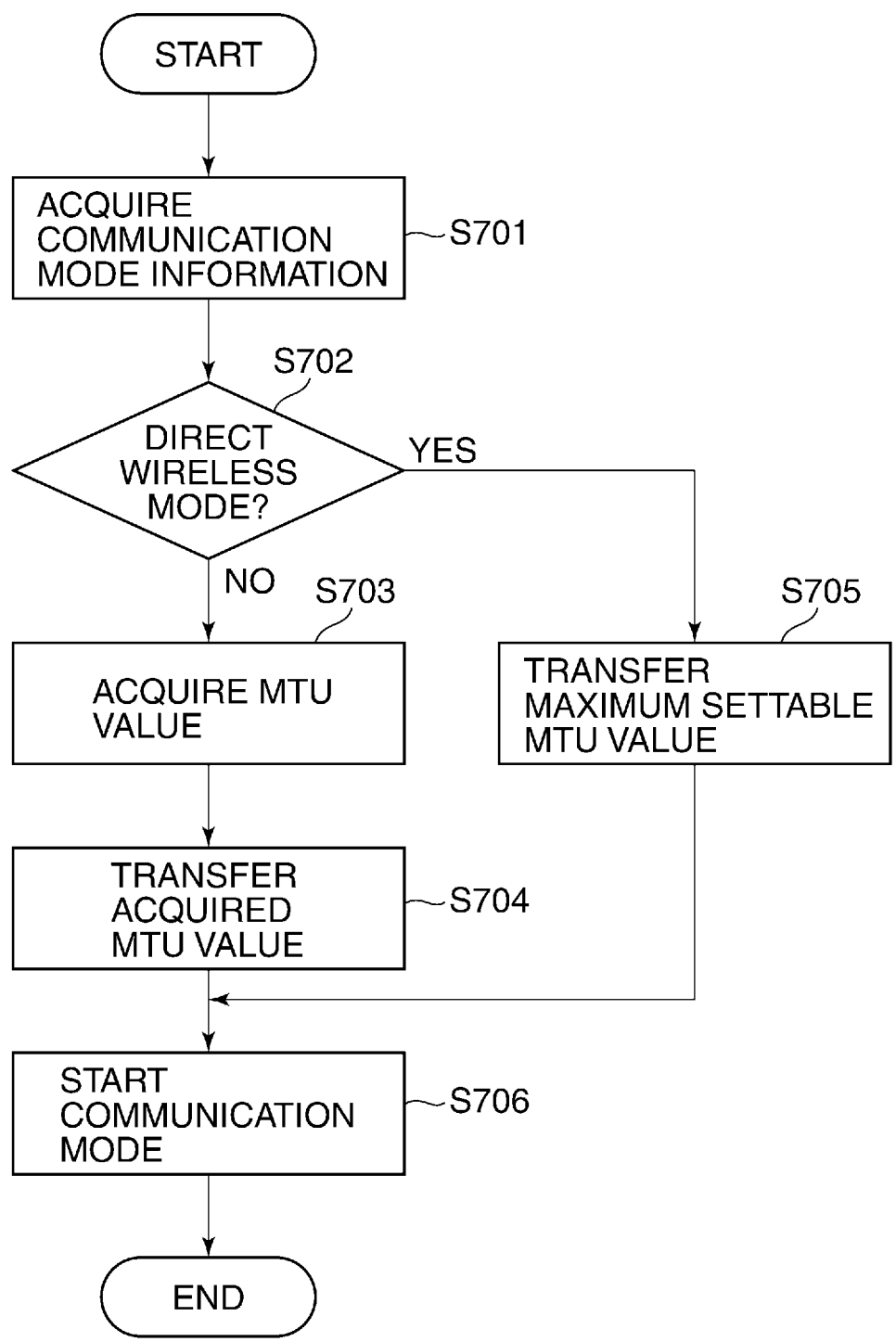
FIG. 7 is a flowchart indicating an MTU value set process as a control method for the communication apparatus according to the first embodiment of the present invention.

FIG. 7 is a flowchart indicating an MTU value set process as a control method for the communication apparatus according to the present embodiment. The process in FIG. 7 is executed when the mode switching part 302 switches the communication mode based on the setting of the communication mode of the image forming apparatus 100 (that is, selection of the option) performed on the wired/wireless LAN selection screen 400 or wireless LAN setting screen 500. Alternatively, the process in FIG. 7 is executed as one process of a series of initialization processes that are integrally executed when the image forming apparatus 100 is started. Here, each step of the FIG. 7 is realized through by the CPU 202 execution of a control program stored in one of the RAM 203, ROM 204, and HDD 214 in the image forming apparatus 100 by the CPU 202.

In FIG. 7, firstly, the mode switching part 302 (mode determination unit) acquires the communication mode information maintained in the memory part 301 (step S701) and determines whether or not the communication mode of the image forming apparatus 100 is the direct wireless mode (step S702).

As a result of the determination in step S702, when the communication mode is not the direct wireless mode, that is, when the mode is the wired mode or infra mode, the mode switching part 302 acquires an MTU value from the memory part 301 (step S703). Next, the mode switching part 302 transfers the acquired MTU value to the wired mode control part 308 as the MTU value of the wired mode or to the infra mode control part 306 as the MTU value of the infra mode (step S704). After that, the mode switching part 302 starts the wired mode or infra mode as the communication mode of the image forming apparatus 100 (step S706). More specifically, the mode switching part 302 starts the wireless communication part 307 or wired communication part 309, starts to supply power to the wireless LAN I/F 212 or wired LAN I/F 213, and further starts the communication control part 303. With this, when the communication mode is the wired mode, the wired communication part 309 becomes able to communicate with an external apparatus in the wired mode. Further, when the communication mode is the infra mode, the wireless communication part 307 becomes able to communicate with an external apparatus in the infra mode. In this case, the size of a packet to be transmitted in the wired mode or infra mode (an acceptable amount of data to be transmitted in communication) is set with the MTU value acquired in step S703. In other words, the size of a packet to be transmitted is set with the MTU value that the user has input on the MTU value input screen 600. After that, the process terminates.

As a result of the determination in step S702, when the communication mode is the direct wireless mode, the mode switching part 302 does not acquire the MTU value from the memory part 301. As a substitute for acquiring the MTU value, the mode switching part 302 transfers a maximum MTU value in settable MTU values (a maximum transmittable amount of the data in the first communication mode) to the direct wireless mode control part 305 as the MTU value of the direct wireless mode (step S705). In the present embodiment, since the MTU value input screen 600 has the three selectable options of "1300" 601, "1400" 602, and "1500" 603 as described previously, 1500 bytes corresponding to the "1500" 603 is transferred as the MTU value of the direct wireless mode. After that, the mode switching part 302 starts the direct wireless mode as the communication mode of the image forming apparatus 100 (step S706). More specifically, the mode switching part 302 starts the wireless communication part 307, starts to supply power to the wireless LAN I/F 212, and further, starts the communication control part 303. With this, the wireless communication part 307 becomes able to communicate with an external apparatus in the direct wireless mode. In this case, the size of the packet to be transmitted in the direct wireless mode (an acceptable amount of data to be transmitted in communication) is set to the MTU value which is transferred in step S705, that is, 1500 bytes which is the maximum MTU value among the settable MTU value. After that, the process terminates.

According to the process in FIG. 7, when the communication mode of the image forming apparatus 100 is the wired mode or the infra mode, the MTU value input on the MTU value input screen 600 is set as the MTU value of the wired mode or the MTU value of the infra mode. Further, when the communication mode is the direct wireless mode, the maximum MTU value among the settable MTU values provided in the MTU value input screen 600 is set as the MTU value of the direct wireless mode. In other words, the MTU value of each mode varies according to the communication mode of the image forming apparatus 100. Thus, for example, even when the "1300" 601 is selected on the MTU value input screen 600 and the MTU value is set to 1300 bytes, 1300 bytes is not set as the MTU value in the direct wireless mode. This prevents a transmission packet smaller than 1500 bytes from being transmitted in the direct wireless mode. As a result, unnecessary deterioration of data transmission performance can be prevented. On the other hand, for example, when the "1300" 601 is selected on the MTU value input screen 600 and the MTU value is set to 1300 bytes, 1300 bytes is set as the MTU value in the wired mode or infra mode. With this, even when a path having a transmittable data amount smaller than 1500 bytes exists between the image forming apparatus 100 and PC 130, the transmission packet can be smoothly transmitted since the size of a transmission packet can be made smaller than 1500 bytes.

Further, since the MTU value input screen 600 has three options of the "1300" 601, "1400" 602, and "1500" 603 that represent MTU values, the usability of the user when inputting an MTU value can be improved.

Here, according to the present embodiment, it is assumed that one of the wired mode, direct wireless mode, and infra mode is exclusively started; however, at least two of the wired mode, direct wireless mode, and infra mode may be started at once. In this case, the wired/wireless LAN selection screen 400 and wireless LAN setting screen 500 may be constructed so that options representing transmittable data amounts for respective communication modes can be selected at once. More specifically, the wired/wireless LAN selection screen 400 and wireless LAN setting screen 500 may be constructed so that whether or not starting each of the respective communication modes corresponding to the options provided in these screens can be set individually. Further, a predetermined MTU value set in advance, for example, a maximum transmittable amount of the data in communication between the image forming apparatus 100 and mobile terminal 150 may be set as the MTU value of the direct wireless mode.

Next, a second embodiment of the present invention will be explained.

The second embodiment of the present invention is different from the first embodiment only in that the user can arbitrarily set the MTU value of the direct wireless mode in addition to the MTU value of the wired mode and the MTU value of the infra mode. Thus, the explanation of the structure and effect same as those of the first embodiment will be omitted and different structure and effect will be explained below.

Figure 8:
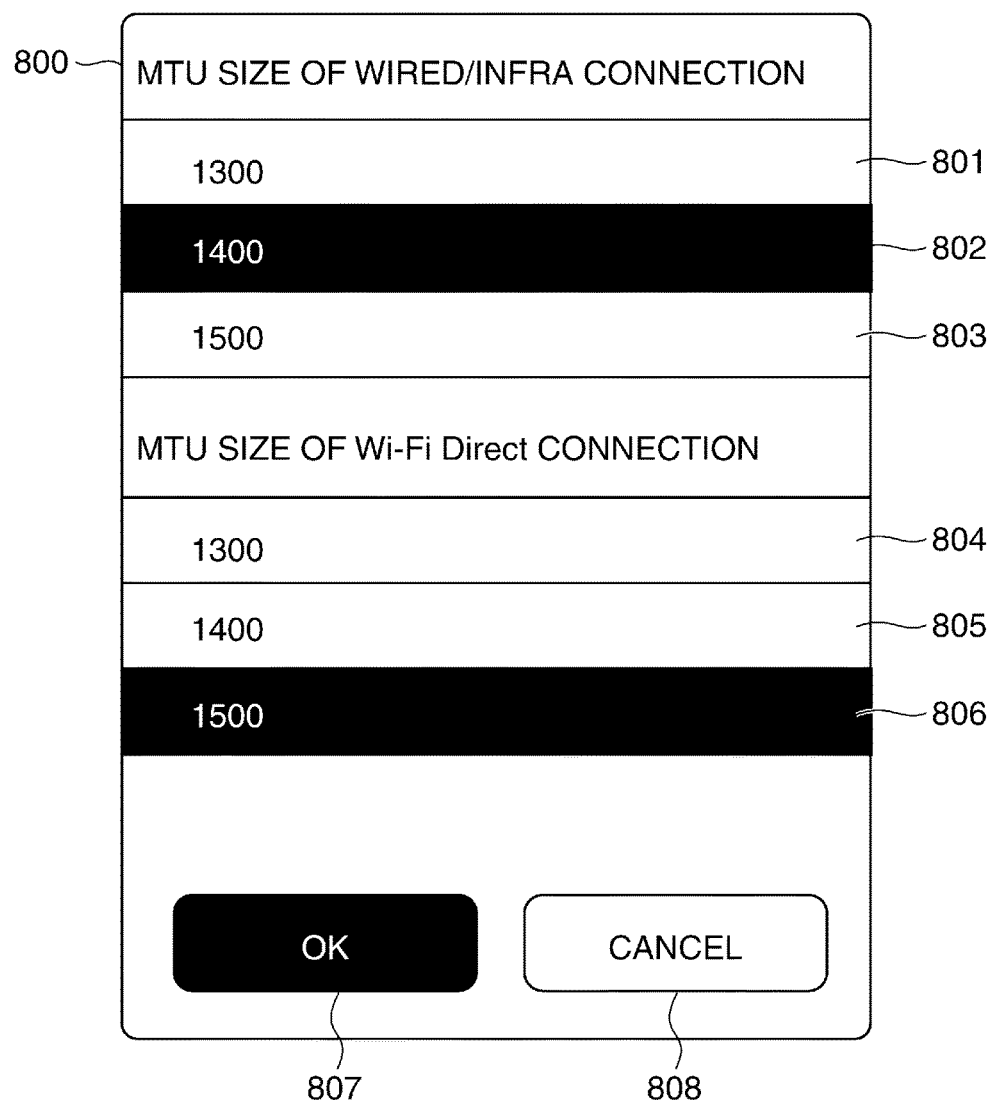
FIG. 8 is a diagram showing an example of an MTU value input screen according to a second embodiment of the present invention.

FIG. 8 is a diagram showing an example of an MTU value input screen according to the second embodiment.

The MTU value input screen 800 (data amount input unit) of FIG. 8 is one of a plurality of setting menus to be displayed on the liquid crystal display of the operation panel 211 and is used to input an MTU value (transmittable data amount). The MTU value input screen 800 includes three options of a "1300" 801, a "1400" 802, and a "1500" 803 to input the MTU value of the wired mode and the MTU value of the infra mode. Further, the MTU value input screen 800 includes three options (other options) of a "1300" 804, a "1400" 805, and a "1500" 806 to input the MTU value of the direct wireless mode, and further, includes an OK key 807 and a cancel key 808.

On the MTU value input screen 800, when the OK key 807 is pressed in a condition that one of the three options 801 to 803 is being selected by a cursor or the like, an MTU value corresponding to the selected option is maintained in the memory part 301 as the MTU value (second data amount) of the wired mode. Further, similarly, the MTU value corresponding to the selected option is maintained in the memory part 301 as the MTU value (second data amount) of the infra mode. Further, when the OK key 807 is pressed in a condition that one of the three options 804 to 806 is being selected by a cursor or the like, the MTU value corresponding to the selected option is maintained in the memory part 301 as the MTU value (first data amount) of the direct wireless mode. In other words, with the MTU value input screen 800, the user can input any MTU value, which is different from the MTU value of the wired mode and the MTU value of the infra mode, as the MTU value of the direct wireless mode. Further, when the cancel key 808 is pressed, regardless of the selection of the option by the cursor, the MTU value input screen 800 is immediately terminated without maintaining the MTU value in the memory part 301.

Here, the MTU value input screen 800 includes the three options of the "1300" 801, "1400" 802 and "1500" 803 as options to input the MTU value of the wired mode and the MTU value of the infra mode; however, the options are not limited to this example. Further, the MTU value input screen 800 includes the three options of the "1300" 804, "1400" 805, and "1500" 806 to input the MTU value of the direct wireless mode; however, the options are not limited to this example. For example, the MTU value input screen 800 may further include more different options for inputting the MTU value of the wired mode or the MTU value of the infra mode or more different options for inputting the MTU value of the direct wireless mode. Further, the MTU value input screen 800 may include a field in which the user can directly input a desired MTU value of the wired mode or the like in a text format or the like, as a substitute for the plurality of the options described above. Further, in addition to the MTU value input screen that has options to input the MTU value of the wired mode or the MTU value of the infra mode, another MTU value input screen that has options to input the MTU value of the direct wireless mode may be provided.

Figure 9:
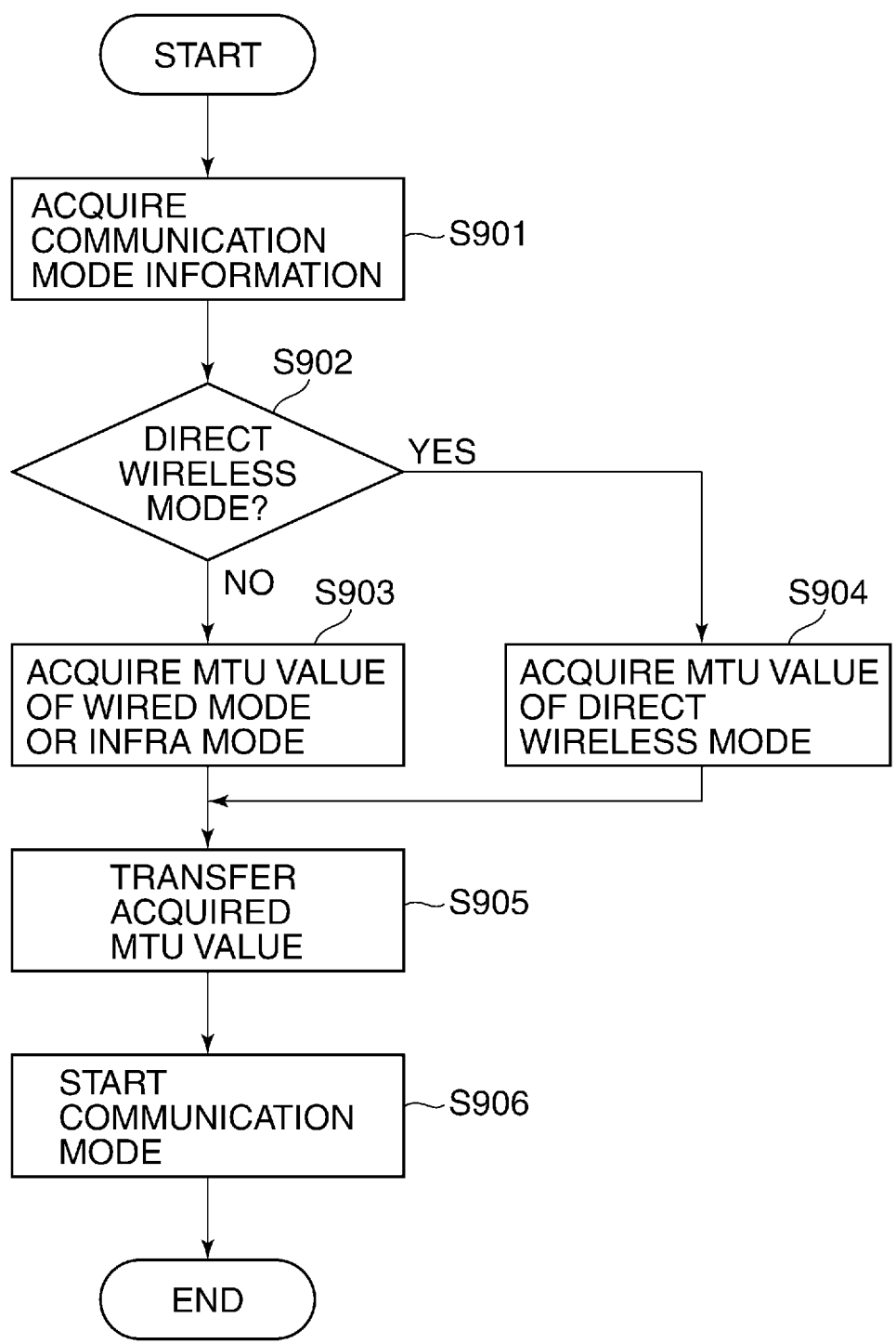
FIG. 9 is a flowchart indicating an MTU value set process as a control method for a communication apparatus according to the second embodiment of the present invention.

FIG. 9 is a flowchart indicating an MTU value set process as a control method for the communication apparatus according to the present embodiment. The process in FIG. 9 is executed when the mode switching part 302 switches the communication mode based on the setting of the communication mode of the image forming apparatus 100 performed on the wired/wireless LAN selection screen 400 or wireless LAN setting screen 500. Alternatively, the process in FIG. 9 is executed as one of the series of the initialization processes which are integrally executed when the image forming apparatus 100 is started. Here, each step of FIG. 9 is realized through by the CPU 202 execution of a control program stored in one of the RAM 203, ROM 204, and HDD 214 of the image forming apparatus 100.

In FIG. 9, firstly, the mode switching part 302 acquires communication mode information maintained in the memory part 301 (step S901) and determines whether or not the communication mode of the image forming apparatus 100 is the direct wireless mode (step S902).

As a result of the determination in step S902, when the communication mode is not the direct wireless mode but the wired mode or infra mode, the mode switching part 302 acquires the MTU value of the wired mode or the MTU value of the infra mode from the memory part 301 (step S903). Next, the mode switching part 302 transfers the acquired MTU value of the wired mode to the wired mode control part 308 or transfers the acquired MTU value of the infra mode to the infra mode control part 306 (step S905). After that, the mode switching part 302 starts the wired mode or infra mode as the communication mode of the image forming apparatus 100 with the same procedures of step S706 in FIG. 7 (step S906). In this case, the size of the packet to be transmitted in the wired mode or infra mode (an acceptable amount of data to be transmitted in communication) is set with the MTU value acquired in step S903. In other words, the size of the packet to be transmitted is set with the MTU value that the user has input on the MTU value input screen 800. After that, the process terminates.

As a result of the determination in step S902, when the communication mode is the direct wireless mode, the mode switching part 302 acquires the MTU value of the direct wireless mode from the memory part 301 (step S904). Next, the mode switching part 302 transfers the acquired MTU value of the direct wireless mode to the direct wireless mode control part 305 (step S905). After that, the mode switching part 302 starts the direct wireless mode as the communication mode of the image forming apparatus 100, with the same procedures of step S706 in FIG. 7 (step S906). In this case, the size of the packet to be transmitted in the direct wireless mode (an acceptable amount of data to be transmitted in communication) is set with the MTU value acquired in step S904. In other words, the size of the packet is set with the MTU value of the direct wireless mode input by the user via the MTU value input screen 800. After that, the process terminates.

According to the process of FIG. 9, when the communication mode of the image forming apparatus 100 is the direct wireless mode, the MTU value of the direct wireless mode input on the MTU value input screen 800 is set as the MTU value of the direct wireless mode. Further, when the communication mode is the wired mode or infra mode, the MTU value of the wired mode or the MTU value of the infra mode input on the MTU value input screen 800 is set as the MTU value of the wired mode or the MTU value of the infra mode. Thus, for example, even when the "1300" 801 is selected on the MTU value input screen 800 and the MTU value of the wired mode or the MTU value of the infra mode is set as 1300 bytes, 1300 bytes is not set as the MTU value of the direct wireless mode. This can prevent unnecessary deterioration of the data transmission performance in the direct wireless mode. Further, with the MTU value input screen 800, since the user can input any MTU value of the MTU value of the direct wireless mode in addition to the MTU value of the wired mode or infra mode, the flexibility for the user related to the setting of the MTU value of each mode can be improved.

Further, the MTU value input screen 600 has three options to input the MTU value of the wired mode or infra mode and further has three options to input the MTU value of the direct wireless mode. This improves the usability for the user when inputting the MTU value of each mode.

Each embodiment of the present invention has been explained; however, the present invention is not limited to the above described embodiments.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-164054, filed Aug. 21, 2015 which is hereby incorporated by reference wherein in its entirety.

What is claimed is:

1. A communication apparatus comprising:
a display device configured to display information;
a wireless LAN interface capable of being used in a wireless LAN communication; and
at least one controller configured to function as:
a unit configured to cause the display device to display a first screen thereon through which one communication mode can be selected from among a plurality of communication modes including a first communication mode and a second communication mode, the first communication mode being a communication mode in which the communication apparatus directly communicates with an external apparatus using the wireless LAN interface via no another apparatus, the second communication mode being a communication mode in which the communication apparatus communicates with the external apparatus using the wireless LAN interface via at least another apparatus providing an access point;
a unit configured to cause the display device to display a second screen thereon through which setting of a maximum data size indicating a unit which can be transmitted at once via the wireless LAN interface can be accepted; and
a unit configured to cause the communication apparatus to communicate with external apparatus in accordance with the maximum data size set through the second screen in a case where the second communication mode is selected and cause the communication apparatus to communicate with external apparatus in accordance with a maximum data size other than the maximum data size set through the second screen in a case where the first communication mode is selected.

2. The communication apparatus according to claim 1, wherein
the second screen is a setting screen promoting the user to set the maximum data size.

3. The communication apparatus according to claim 2, wherein the second screen has plural selectable options which respectively correspond to respective maximum data sizes, each of the maximum data sizes being different from the others.

4. The communication apparatus according to claim 2, wherein, in the setting screen, the number of bytes smaller than 1500 bytes can be set as the maximum data size.

5. The communication apparatus according to claim 1, wherein in the first communication mode, the communication apparatus communicates with the external apparatus using a size of 1500 bytes.

6. The communication apparatus according to claim 1, wherein the communication apparatus and the external apparatus are directly and wirelessly connected with each other in the first communication mode.

7. The communication apparatus according to claim 1, wherein the first communication mode is a communication mode in which a Wi-Fi Direct function is used.

8. The communication apparatus according to claim 1, further comprising an image forming device configured to form an image on a sheet based on print data,
wherein the image forming device acquires the print data from the external apparatus through the communication with the external apparatus.

9. The communication apparatus according to claim 1, further comprising an image reading device configured to read an image from an original, wherein the image reading device transmits the read image to the external apparatus through the communication with the external apparatus.

10. The communication apparatus according to claim 1, wherein the maximum data size is a Maximum Transmission Unit (MTU) value.

11. A control method for a communication apparatus having a display device displaying information and a wireless LAN interface capable of being used in a wireless LAN communication, the control method comprising:
  causing the display device to display a first screen thereon through which one communication mode can be selected from among a plurality of communication modes including a first communication mode and a second communication mode, the first communication mode being a communication mode in which the communication apparatus directly communicates with an external apparatus using the wireless LAN interface via no another apparatus, the second communication mode being a communication mode in which the communication apparatus communicates with the external apparatus using the wireless LAN interface via at least another apparatus providing an access point;
  causing the display device to display a second screen thereon through which setting of a maximum data size indicating a unit which can be transmitted at once via the wireless LAN interface can be accepted;
  causing the communication apparatus to communicate with external apparatus in accordance with the maximum data size set through the second screen in a case where the second communication mode is selected; and
  causing the communication apparatus to communicate with external apparatus in accordance with a maximum data size other than the maximum data size set through the second screen in a case where the first communication mode is selected.

12. A computer-readable non-transitory storage medium storing a program for causing a computer to execute a control method for a communication apparatus having a display device displaying information and a wireless LAN interface capable of being used in a wireless LAN communication, the control method comprising:
  causing the display device to display a first screen thereon through which one communication mode can be selected from among a plurality of communication modes including a first communication mode and a second communication mode, the first communication mode being a communication mode in which the communication apparatus directly communicates with an external apparatus using the wireless LAN interface via no another apparatus, the second communication mode being a communication mode in which the communication apparatus communicates with the external apparatus using the wireless LAN interface via at least another apparatus providing an access point;
  causing the display device to display a second screen thereon through which setting of a maximum data size indicating a unit which can be transmitted at once via the wireless LAN interface can be accepted;
  causing the communication apparatus to communicate with external apparatus in accordance with the maximum data size set through the second screen in a case where the second communication mode is selected; and
  causing the communication apparatus to communicate with external apparatus in accordance with a maximum data size other than the maximum data size set through the second screen in a case where the first communication mode is selected.

* * * * *